United States Patent [19]

Yoshida et al.

[11] 4,365,659

[45] Dec. 28, 1982

[54] PNEUMATIC SAFETY TIRE

[75] Inventors: Akira Yoshida, Itami; Masanori Kan, Amagasaki, both of Japan

[73] Assignee: The Toyo Rubber Industry Co., Ltd., Osaka, Japan

[21] Appl. No.: 839,014

[22] Filed: Oct. 3, 1977

[30] Foreign Application Priority Data

Oct. 2, 1976 [JP] Japan .................................. 51-118732

[51] Int. Cl.³ .............................................. B60C 17/00
[52] U.S. Cl. .......................... 152/354 R; 152/330 RF; 152/352 A; 152/353 R; 152/374
[58] Field of Search ........ 152/330 RF, 352 R, 352 A, 152/353 R, 354, 357 R, 362 R, 374, 379.1; 260/42.47, 890

[56] References Cited

U.S. PATENT DOCUMENTS

| | | | |
|---|---|---|---|
| 3,935,892 | 2/1976 | Arimura et al. | 152/330 RF |
| 3,951,192 | 4/1976 | Gardner et al. | 152/379.1 |
| 3,954,131 | 5/1976 | Hoshino et al. | 152/353 R X |
| 3,968,076 | 7/1976 | Gessler et al. | 260/42.47 X |
| 4,042,742 | 8/1977 | Bergomi | 152/354 R |
| 4,057,092 | 11/1977 | Tracy | 152/353 R X |
| 4,061,172 | 12/1977 | Yoshida et al. | 152/352 AL X |
| 4,067,374 | 1/1978 | Alden et al. | 152/330 RF X |

FOREIGN PATENT DOCUMENTS 52-31404  3/1977  Japan ............................ 152/330 RF

*Primary Examiner*—Randolph Reese
*Attorney, Agent, or Firm*—Flynn, Thiel, Boutell & Tanis

[57] ABSTRACT

The present invention relates to a pneumatic safety tire, which is provided with a ring-shaped projection of high rigidity along its circumferential direction, outside of at least one bead of the pneumatic tire, wherein the projection has a smaller diameter than the diameter of the rim flange to which the tire is fitted. The ring-shaped projection is designed so that it projects to the outside along the rim flange, and moreover, the tire is adhered integrally by vulcanization together with two ring-shaped elastic reinforcements and halogenated butyl rubber-containing protective layer in the inside of the tire at each position corresponding to the portion from the sidewall to the adjacent shoulder. Thus, the purpose of the invention is to provide a pneumatic safety tire, which can be driven safely without there happening such an accident as separation of the bead of the tire from the rim during running, even when the tire is run flat and moreover, has a good stability and durability in running also in such a state.

12 Claims, 11 Drawing Figures

PNEUMATIC SAFETY TIRE

BACKGROUND OF THE INVENTION

1. Field of the Invention

The present invention relates to a pneumatic safety tire and especially, the invention provides an improved pneumatic safety tire which can be used safely without there happening any separation of the bead portions of the tire from the rim flange (hereafter, this accident will be called as bead/rim separation) during running even in the so called "run flat" state which occurs due to an extreme decrease of the inner pressure within the tire or to a puncture (hereafter, the state will be called "run flat",) and moreover, it has a sufficient ability to bear a load and a sufficient durability.

2. Description of the Prior Art

As the conditions, necessary for a pneumatic safety tire, the following items can be pointed out. That is, the conditions are (A) bead/rim separation does not happen even when a puncture of the tire happens, (B) even when a puncture of the tire does happen, it should be possible to continue driving without rapidly changing the vehicle's running direction owing to the puncture shock and to brake it to a stop after a short period of normal running and (C) even in case of "run flat", the tire should have a sufficient durability and offer a sufficient safety in driving to permit the car to be run at an appropriate running speed for a necessary distance, in order to make it possible to safely escape from the highway by maintaining a not extremely bad driving condition.

In other words, it can be concluded that the necessary conditions for a pneumatic safety tire are that even in the case of a flat tire, bead/rim separation does not occur and moreover, the cornering power and cornering force do not extremely decrease.

Pneumatic safety tires for cars, tires which not only have an ability to run just the same as general tires in the normal state where the inner pressure is normal, but also have an ability to run to some extent even in a punctured state, have already been proposed. Examples of those tires are (1) a tire whose air chamber is filled with foam, (2) a tire provided with a supporter within it, in order to support the load in an emergency case of "run flat", (3) a tire having a double chamber structure, by inserting another tire within it, (4) a tire provided with a ring-formed projection on the outside of the rolling axis along the rim flange and (5) a tire whose side wall and/or shoulder are reinforced.

Those tires exemplified above have following disadvantages. The tire exemplified as (1) is not acceptable for use on an ordinary car, since it generates a lot of heat by high speed running. In case of the tire (2), though it is possible to satisfy the item (A) of the necessary conditions mentioned above, in order to satisfy the items (B) and (C), it necessitates providing a strong supporter of a sufficient height and moreover to use a lubricating agent, etc. in order to decrease the frictional resistance between the supporter and the inner portion of the tire. This brings about a considerable increase of the weight and increase of the complexity in mounting and dismounting the tire, which is a great disadvantage of a tire of this type. The tire exemplified as (3) still has the possibility that a puncture of both inside tire and outside tire can happen at once and also it has the same disadvantage as the tire, (2) such as the necessity to use a lubricating agent, the increase of complexity in mounting it onto a rim and dismounting it from the rim and the increase of the weight of the tire itself as mentioned above. As an example of the tire classified as (4), U.S. Pat. No. 2,037,640 can be exemplified. This type of tire is surely capable of satisfying the item (A) of the necessary conditions, however, the production of the tire (4) and its mounting and dismounting are very difficult and also the items (B) and (C) of the necessary conditions can never be satisfied and, moreover, it should be pointed out that the tire belonging to the class (4) is not proper for use on any ordinary car which runs at a high speed. The tire disclosed in U.S. Pat. No. 2,874,745 relates to a tire which can be applied for agricultural use and even though it is possible to satisfy the item (A) of the necessary conditions, it can never satisfy the items (B) and (C) and, moreover, its mounting and dismounting are very difficult to carry out. Further, the tire disclosed in U.S. Pat. No. 4,061,172 satisfies the item (A) of the necessary conditions and those tires disclosed in U.S. Pat. No. 3,983,920 and U.S. Pat. No. 4,034,792 can satisfy the item (A) only in a case of very slow turning speed. However, since the side portions of those tires cannot bear the load in the state of "run flat", a considerable decrease of cornering power is inevitable. Thus, in those tires, the running speed and the possible distance to be driven in an emergency case of "run flat" extremely decrease and accordingly, it is concluded that the durability and the stability in driving are almost lost.

Thus, the tire described in (5) has been spot-lighted as a useful pneumatic tire, and it has been called a Combat type tire. However, a tire of this type has the following defects and accordingly, it leaves problems to be solved. Each tire is disclosed in U.S. Pat. No. 3,911,987, U.S. Pat. No. 3,949,798, U.S. Pat. No. 3,954,131, U.S. Pat. No. 3,964,532 and U.S. Pat. No. 3,983,919, which belong to the classification (5), have such a structure that an elastic reinforcement is inserted between a pair of carcass plies or is added within the inside of the tire at the region corresponding to the portion from the side wall to the shoulder (hereafter, the portion will be called as the side portion). However, an easy occurrence of bead/rim separation during "run flat" is the first defect of the tire of this type.

It is impossible in the tire of this type to satisfy the items (A), (B) and (C) of the necessary conditions mentioned above, unless a rim of the flat base type is used, or another element to prevent the bead/rim separaton is used together with the tire in order to remove said defect. Furthermore, it should be pointed out that even if said defect is removed by such a counter measure as mentioned above, the appearance of other defects such as cracking in the inside of the shoulder in normal running and the separation of the shoulder portion due to an excessive heat build-up in high speed running, etc. are inevitable, since it is necessary to make the thickness of the side portion considerably large in order to bear the load in the emergency case of "run flat". Furthermore, it is true that if a conventional rubber compound is used for the material to reinforce the side portion, decomposition and carbonization of the rubber layer occur due to a violent generation of heat in the running during "run flat" and with the progress of such phenomena, a flex fatigue abrasion occurs and finally, the structure of the side portion is destroyed and further running of the tire becomes impossible.

SUMMARY OF THE INVENTION

The pneumatic tire of the present invention has at least one special ring-shaped projection adjacent to a bead of the tire and it is adhered integrally by vulcanizing together with two ring-formed elastic reinforcements and a halogenated butyl rubber-containing protective layer in the inside of the side portions. Bead/rim separation never happens in the running during an emergency case of "run flat" and moreover, a sufficient stability and a durability in driving can be achieved even in such an emergency case.

DETAILED DESCRIPTION OF THE INVENTION

The present invention will be explained in detail by reference to the attached drawings.

Figure 1:
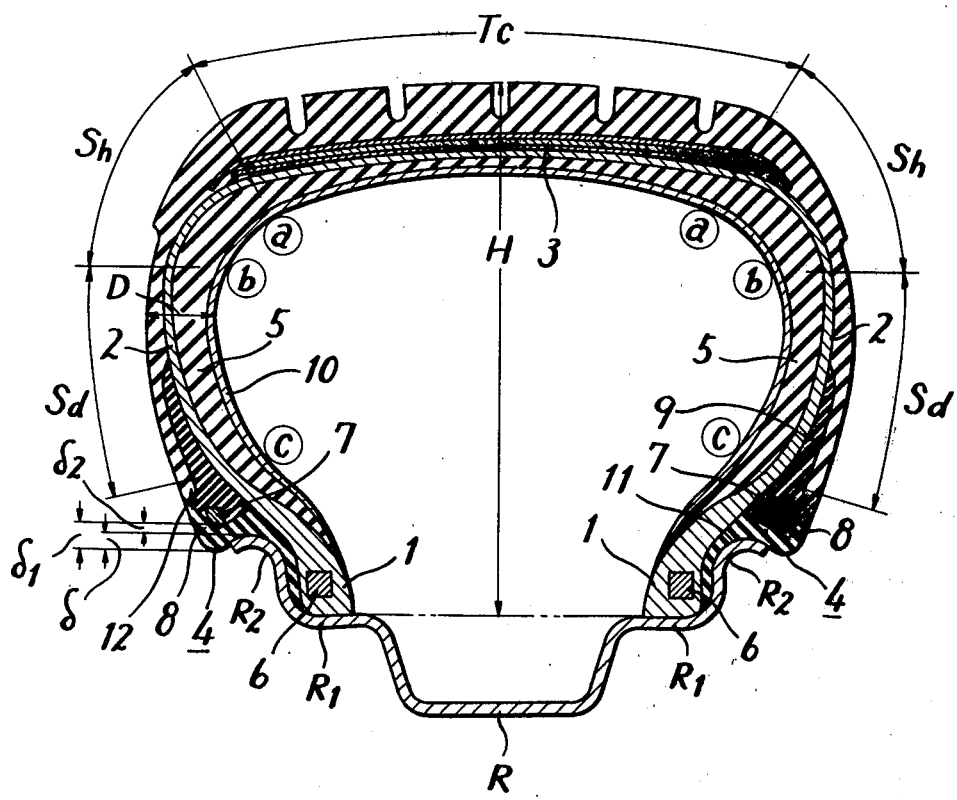
FIG. 1 is a radial sectional view of the important portion of the pneumatic safety tire of the present invention.

FIG. 1 is a radial sectional view of the pneumatic safety tire of the present invention. Referring to this figure, the mechanism whereby damage occurs to the side portion of a tire belonging to the class (5) mentioned above, will be explained.

The ⓑ and ⓒ portions, which are situated at the inside of the ring-formed reinforcement (5) (hereafter, this will be called simply as the side reinforcement) situated in the side portion of the tire in FIG. 1, become compressed when the tire runs in a flat condition. Furthermore, since the thicknesses of those portions are large, an excessive heat build-up occurs because of the compression of those portions. Or, in other words, wrinkles appear in said ⓑ and ⓒ portions caused by the compression, at first, and then, an excessive heat build-up acts to expel volatile components from the wrinkled rubber portion resulting the decomposition and the carbonization and, finally, the combination of those physical and chemical changes causes abrasion by flex fatigue (hereafter this will be called simply,) of the said portions.

Furthermore, the ⓐ portion in FIG. 1 is considered to be acted on by a small tension force at the same time. This action sometimes causes cracking of this portion if the tire is made of a rubber derived from a conventional rubber compound. If the side reinforcement (5) has sufficient rigidity, such as by being made of a hard rubber such as ebonite, to bear a load which is added to the tire without any appreciable deformation, the tension which acts in the ⓐ portion and the compression which acts in the ⓑ and ⓒ portions do not cause wrinkles, thermal decomposition, carbonization and abrasion. Of course, it is impossible to use such a rigid body as a material for tires. In a practical case when an elastic material is used for the reinforcement, even though it has a certain degree of rigidity, it is inevitable that the ⓑ and ⓒ portions well follow the above-described course from wrinkling to abrasion and eventually it becomes impossible to run the tire further, sooner or later. On the other hand, the result of a high speed test on a tire whose side portion is reinforced with a conventional rubber material teaches that troubles such as separation, etc. induced by the heat build-up in the shoulder ($S_h$) occur between the side reinforcement (5) and the carcass (2), and/or between the carcass (2) and breaker.

The present invention provides a pneumatic safety tire whose characteristic properties are very much improved and whose structure is as follows as shown in FIG. 1. That is, it is composed of a pair of the bead portions (1), (1), a carcass (2) which is composed of at least one layer of cords oriented so that their cord direction is parallel or almost parallel to the axis direction and covered with a rubber layer which combines each bead with the breaker (3) which is composed of rubber-coated cord layers intersecting the equator line of the tire at an angle smaller than 60° on the upper side of said carcass (2). Thus, the tire forms a pair of the side walls ($S_d$), ($S_d$), a pair of the shoulders ($S_h$), ($S_h$) and the tread crown ($T_c$).

Here, the characteristic feature of the pneumatic tire of the present example is that, firstly, it is provided with two ring-shaped projections (4), (4), wherein each projection (4) is situated along the flange ($R_2$) which is extended from the flange sheet ($R_1$) of the rim (R) situated at the outside of the bead (1). The projection (4) projects axiallly outward as well as radially inwardly toward the rotatioal axis of the tire relative to the outer side of the flange ($R_2$), thereby forming a smaller diameter than the diameter of the flange ($R_2$). Moreover, the projection (4) is disposed so as to have a high rigidity along its circumferential direction. Secondly, the tire is adhered integrally by vulcanizing together with two side reinforcements (5), (5) which extend from the side wall ($S_d$) to the shoulder ($S_h$) on the inside of it and a halogenated butyl rubber-containing protective layer (10) situated on the inside of the tire. Of course, the side reinforcements (5), (5) can be extended up to the portion corresponding to the tread crown ($T_c$) beyond the side wall ($S_d$) and the shoulder ($S_h$) until they join to each other as shown in FIG. 1. In this case, the thickness of the elastic side reinforcement (5) at the portion of the tread crown ($T_c$) should be gradually decreased from the shoulder ($S_h$) to the center of the tread crown ($T_c$).

Furthermore, although it is desirable to provide a pair of the ring-shaped projections (4), (4) adjacent both of the beads (1), (1), both projections are not always necessary. The purpose of the present invention can also be attained even if only one projection (4) is provided. However, in this case, the tire should have the single projection (4) located on its outer side when the tire is mounted on a rim.

In each bead (1), the bead wire (6), which is composed of a well-known material having a high rigidity such as steel wire, is laid in a ring form in the circumferential direction of the tire. In the present invention, the structure of each projection (4) is designed so that it has a high elastic modulus almost equal to that of the bead (1). For this purpose, various designs may be possible, for example, in FIG. 1, a ring-shaped rigid reinforcement (7) in disposed in each projection, which rigid reinforcement is composed of a material of high rigidity, and it is laid in a ring form in the circumferential direction of the tire.

As the material of high rigidity for the rigid reinforcement (7), bead wire, steel wire, glass cord, rubber reinforced with glass fiber, plastic material reinforced with glass fiber, etc. are useful. The Young's modulus of the rigid reinforcement (7) should be more than 2,000 kg/mm$^2$ and the breaking strength should be more than 400 kg. A reinforcement whose mechanical properties are inferior to those mentioned above cannot be used as the rigid reinforcement (7), since such a reinforcement will occasionally break in a tire when the tire is run flat at a high speed.

Furthermore, the outside rubber layer (8) at the top end of the projection (4) (the layer (8) is the shaded portion in FIG. 1) is desired to have a JIS hardness such as 65°–85° or more preferably should be about 75°.

The rubber layer (9), which is disposed adajcent the remainder of the rigid reinforcement (7) and is located in the upper inside of it, is desired to have a JIS hardness such as 50°–70° or more preferably, is 60°. In the present invention, the difference ($\delta$) between two radii, the largest radius in the rim flange ($R_2$) and the radius of the ring-shaped projection (4) at its top end when it is fitted on the rim without any inner pressure and load, is designed to be 2–7 mm.

Of course, it should be remarked that the pneumatic safety tire of the present invention is designed so that any radius of the tire from its top end of the projection (4) through the concave portion (11) to the base position of the bead (1) is smaller than the largest radius of the rim (R) whe the tire is not yet mounted on the rim. However, when the tire is mounted on the rim, the concave portion (11) closely contacts with the outer surface of the rim flange ($R_2$) wherein said largest radius of the rim exists and in this state, said difference ($\delta$) is desired to be 2–7 mm, in the present invention.

When said difference ($\delta$) is smaller than 4 mm, the effect, due to the existence of the projection (4) on the bead/rim separation and also on the stability of driving decreases and on the other hand, when the difference ($\delta$) is larger than 7 mm, it becomes necessary to apply a large pressure for mounting of the tire onto the rim, for example, a pressure of above 4 kg/cm$^2$ is necessary for the mounting of same onto a rim of a passenger car and accordingly, danger happens occasionally. Moreover, in the vulcanization process, some troubles happen such as the flow of rubber material into a mould corresponding to the ring-shaped projection (4) becomes difficult and also the separation of the tire from the mould after the vulcanization without giving any damage to the projection becomes difficult.

Furthermore, the hardness of the rubber layer (8) at the top end of the ring-shaped projection (4) should be within the range mentioned above. If the hardness is larger than said range, the flexibility decreases and if the hardness is smaller than the range, upon the mounting of the tire onto the rim, the projection is often bitten into by the inner part of the flange ($R_2$).

Furthermore, it is more desirable to reinforce the bead (1) including the ring-shaped projection (4) in the region of from the neighborhood of the ring-shaped rigid reinforcement (7) to the base position of the bead (1) with those materials such as steel cord, textile cord, etc., since the frictional abrasion of the tire with the rim flange can be decreased.

The difference ($\delta_2$) between two radii, the inner radius of the rigid reinforcement (7) and the largest radius of the rim flange ($R_2$), is desirable to be as small as possible, such as it is in a range of 0–3 mm or more desirably, it is about 1.5 mm. This small difference between the two radii will serve to increase the forming ability of the tire in vulcanization.

Next, the side reinforcement (5), which is provided for the reinforcement of the side wall and the shoulder, plays an important role, and it cooperates with the reinforcement (7) and the rubber layers (8), (9) around it, for providing stability and durability during driving in a flat condition in an emergency. In the present invention, the thickness of the side reinforcement (5) is designed to be largest at the shoulder ($S_h$) situated at the intermediate region between the tread crown ($T_c$) and the side wall ($S_d$) and to decrease gradually in both regions from said shoulder toward the tread crown ($T_c$) and the side wall ($S_d$). The protective layer (10) is extended over the side reinforcement (5) on the inside of the tire and is adhered integrally to it by vulcanizing.

Here, the tire thickness (D) in the neighborhood of the boundary between the shoulder ($S_h$) and the side wall ($S_d$) is desired to be 0.06 to 0.20 times the height (H) of the tire or more desirably, it is 0.08 to 0.15 times of the height (H). By such a design, the cornering force and the durability of the tire during running in a flat state can be increased. If said ratio of the tire thickness (D) to the height (H) of the tire is less than 0.06, the tire thickness (D) exemplified in the present example, becomes smaller than 3 mm and the net thickness of the side reinforcement (5) also becomes smaller than 4 mm. This causes the undesirable result that the cornering force becomes less than 20% and the durability of tire in running flat at a speed of 80 km/hr under a load of 300 kg in an emergency becomes less than 40 minutes. On the other hand if the ratio exceeds 0.20, although the stability in driving and the durability of tire in running flat become more and more improved, the weight of such a tire becomes too heavy and also the mounting of the tire onto a rim and the dismounting of the tire from it become very difficult.

Furthermore, in order to specify the composition of each rubber compound to be used for the side-reinforcement (5) and the protective layer (10), a series of preliminary tests were carried out, wherein the state of affairs which caused troubles in various conditions of running flat was observed. That is, in those preliminary tests, the conditions prepared for various states of running flat were with or without the protective layer (10), the difference in the constitution of the side reinforcement (5) in the inside corresponding to the side wall and the shoulder of tire (this is called, simply, the side-reinforcement as in Table 1) and the difference of the composition of the rubber compound. The results obtained are shown in Table 1.

TABLE 1

| Side-rein-forcement | Protective layer | Preliminary Tests Portion of a break down | Condition of a break down |
|---|---|---|---|
| conventional rubber | not provided | inside of (5) | wrinkle-carbonize-abrade |
| | not containing Cl—IIR | (10) | wrinkle-carbonize-abrade |
| | containing Cl—IIR | (5) | destruction of (5) |
| | | (10) | due to the accumulation of heat, a certain degree of carbonization of (10) |
| low heat build-up rubber | not provided | inside of (5) | a certain degree of carbonization and abrasion |
| | not containing Cl—IIR | (10) | a certain degree of carbonization and abrasion |
| | containing Cl—IIR | not trouble | — |

Remark:
Cl—IIR is a chlorinated butyl rubber
(5) is side reinforcement
(10) is protective layer From Table 1, it can be understood that a tire, which is composed of a side reinforcement (5) consisting of a low heat build-up rubber and a protective layer (10) consisted of a halogenated butyl rubber, such as chlorinated butyl rubber-containing rubber material, scarcely undergoes such troubles as carbonization, abrasion, cracking, etc., even if a concentration of stress onto a position of large deformation occurs during running in a flat state. Of course, brominated butyl rubber is also useful in the same way as chlorinated butyl rubber.

Next, from another viewpoint, the origin of damage of a tire when it is tested under the Federal Motor Vehicle Safety Standard (FMVSS), will be explained.

In order to permit a tire which is reinforced with a side-reinforcement as explained above (hereafter, such a tire will be called as the side-reinforced tire, in short) to run safely under such a breaking condition to cords regulated by FMVSS-109 (hereafter, this condition will be called CBU condition in short) or under a condition where a larger load than that regulated by FMVSS-109 is applied, the thickness of the reinforcement at the (a) portion in FIG. 1 should be as large as possible and moreover, its rigidity should be also large. However, it can be pointed out that if it is attempted to let a tire run safely under CBU condition only by an enlargement of the thickness of the reinforcement, this brings the increase of tensile stress, on the other hand.

Here, the running test under CBU condition (hereafter, this test will be called as CBU test) and the running test under the condition of "run flat" (hereafter, this test will be called as the "run flat" test) will be compared with each other from the standpoint of stress distribution. In both cases, the positions in a tire where compression force or tensile force acts are almost same. However, the intensity the force itself is very much different. In the "run flat" test, the compression stress is an important factor and the tensile stress is not so important. Against this, in the CBU test, the tensile stress is an important factor and the compression stress is not so important.

Therefore, in the CBU test, the main trouble is a cracking phenomenon at the (a) portion shown in FIG. 1, where a considerably large stress acts thereon and such a phenomenon as carbonization of rubber at the (b) and (c) portions in FIG. 1 appears only occasionally.

Furthermore, when said side-reinforced tire is tested for high speed running under the regulation of FMVSS-109 or under a condition extended from said condition depending upon FMVSS-109, destruction of the tire sometimes happens due to an exposure of the side-reinforcement (5), carcass and breaker to a high temperature, because of the larger shoulder thickness, the higher heat build-up and less radiant heat of the side reinforced tire, compared with a conventional tire.

Thus, the result shown in Table 1, which was obtained from the "run flat" test, proved to us that the use of halogenated butyl rubber-containing protective layer (10) together with side-reinforcement (5) is very much effective to prevent such troubles as cracking, carbonization, etc. That is to say, by a fundamental improvement of the side-reinforcement (5) and the protective layer (10) and by a proper combination of them, it has become possible to overcome the problems on the pneumatic safety tire such as cracking, etc.

In the pneumatic safety tire of the present invention, the side-reinforcement (5) consists of a low heat build-up rubber compound and the protective layer (10) consists of a rubber compound mainly containing halogenated butyl rubber which has a high flexibility and a large setting ability. The combination of those two elements mentioned above makes it possible for them to play their own roles, that is, the protective layer (10) prevents the concentration of the compression stress onto the portions (b) and (c) shown in FIG. 1 and the side-reinforcement scarcely is liable to undergo destruction because of its low heat build-up.

As the rubber compound for the side-reinforcement (5) of the present invention, a compound whose increase of surface temperature is within the range of 12° C.–3° C. or preferably, within the range of 8° C.–4° C., can be effectively used, wherein said surface temperature increase is determined by the method of ASTM-D632-58A using a Goodrich Flexometer (the atmospheric temperature at the measuring position is 40° C.). If a rubber material whose surface temperature increase, as defined above, is smaller than 4° C. is used for the side-reinforcement (5), the purpose of the present invention cannot be attained, since the rigidity of the rubber material is improper for bearing the load applied to the tire during running in the "run flat" state. And, on the other hand when a rubber material whose surface temperature increase is larger than 12° C. is used, excessive heat build-up happens in the region of the side-reinforcement (5), for example, at the portions (b) and (c) shown in FIG. 1 and the rubber in those portions decomposes to undergo carbonization and at last, becomes subject to abrasion.

Furthermore, the rubber compound which can be used for the protective layer (10) should have such properties as that its flexibility is superior and moreover, its adhesive ability to the side-reinforcement (5) during vulcanizing also is superior so that they are tightly made integral with each other to behave as two intimately cooperating functional elements in the tire. This necessary condition determines the content of halogenated butyl rubber in the rubber compound to be used for the protective layer (10). That is, the content of halogenated butyl rubber should be more than 30% and the remainder is any other rubber of general use. However, the content of halogenated butyl rubber is more desirable to be within the range from 40% to 80%. If the content is less than 30%, said flexibility and setting ability of the rubber compound considerably decrease and on the other hand, if the content is higher than 80%, the adhesive ability of the rubber material to the side reinforcement (5) and/or to the carcass in the vulcanization decreases too much.

Hitherto, it has been a well-known technique to cover the inside wall of a tire, for example, a tube-less pneumatic tire, with a rubber layer which mainly consisted of halogenated butyl rubber. However, the purpose of this treatment is to maintain the inner pressure of the tire constant for a long time by decreasing the permeability of air through the wall of the tire. Therefore, the purpose of the use of halogenated butyl rubber, the condition of the tire at the portion having the side reinforcement (5) adjacent to the layer mainly containing halogenated butyl rubber and also the effect of the use of halogenated butyl rubber in the present invention are very much different from those of the conventional technique. As already explained, in the present invention, the protective layer (10) is formed integrally together with the side-reinforcement (5) in the tire in order to obtain durability and stability during running of the tire flat in an emergency, by an intimate cooperation of them together with the rim-shaped projection (4).

Next, in order to get a rubber compound having a low heat build-up which is useful as the material for the side-reinforcement (5), the relation of heat build-up, hardness and rebound resilience (hereafter, this will be called as rebound, simply) to carbon black loading was examined.

Figure 3:
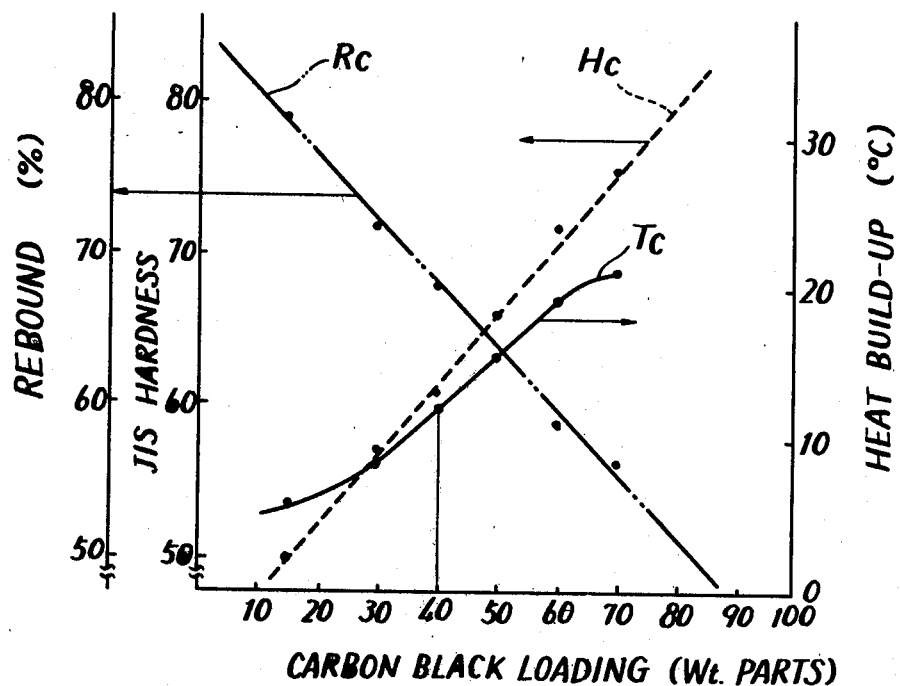
FIG. 3 shows the relations of heat build-up, hardness and rebound to carbon black loading in each rubber compound.

The results are shown in FIG. 3.

The compositions of rubber compounds used in those experiments were as follows: Into a basic compound consisting of 50 parts of BR, 50 parts of NR, 5 parts of zinc oxide, 3 parts of stearic acid, 2 parts of antioxidant D and 5 parts of aromatic oil, various parts of carbon black (HAF) and various parts of accelerator and sulphur were added together (each in parts by weight). In FIG 3, line $T_c$ shows the surface temperature increase (the atmospheric temperature was 40° C.) observed by using the Goodrich Flexometer as already explained, line $H_c$ shows the hardness depending upon JIS and line $R_c$ is the rebound observed by using the Lüpke type tester.

As already explained, in the present invention, the allowable maximum increase of the surface temperature of the side-reinforcement (5), when it is observed by using the Goodrich Flexometer, is 12° C. Therefore, from FIG. 3, it is easily understood that the carbon black loading is not permitted to exceed 40 parts to 100 parts of rubber compound having a low heat build-up, which can be effectively used as the material for the side-reinforcement (5) in the present invention. It is impossible to get a rubber compound having a low heat build-up by using any other inorganic reinforcing agent such as white carbon, solely or together with carbon black.

Figure 4:
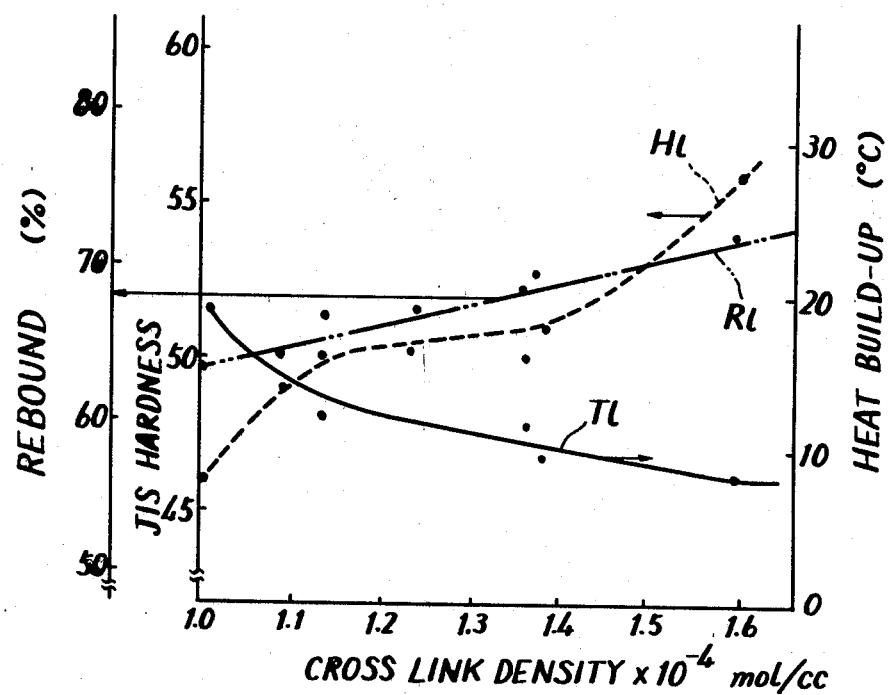
FIG. 4 shows the relations of heat build-up, hardness and rebound to cross-linking density in each vulcanized rubber.

Furthermore, the relation of heat build-up, hardness and rebound to cross-linking is shown in FIG. 4, wherein line TL is the surface temperature increase, line HL is the hardness and line RL is the rebound and the cross-linking density was determined by the data obtained by the linear swelling method using the Flory-Rehner's equation. From FIG. 4, it can be concluded that a cross-linking density of more than $1.2 \times 10^{-4}$ mol/cc is desirable for the present invention.

Next, other experimental results will be shown in order to get a reliable rubber material which has a sufficient flexibility and, accordingly, can be used as the material for the protective layer of the present invention. The relation between the blending ratio of various elastic high polymers and the adhesive ability was experimentally confirmed.

Figure 5:
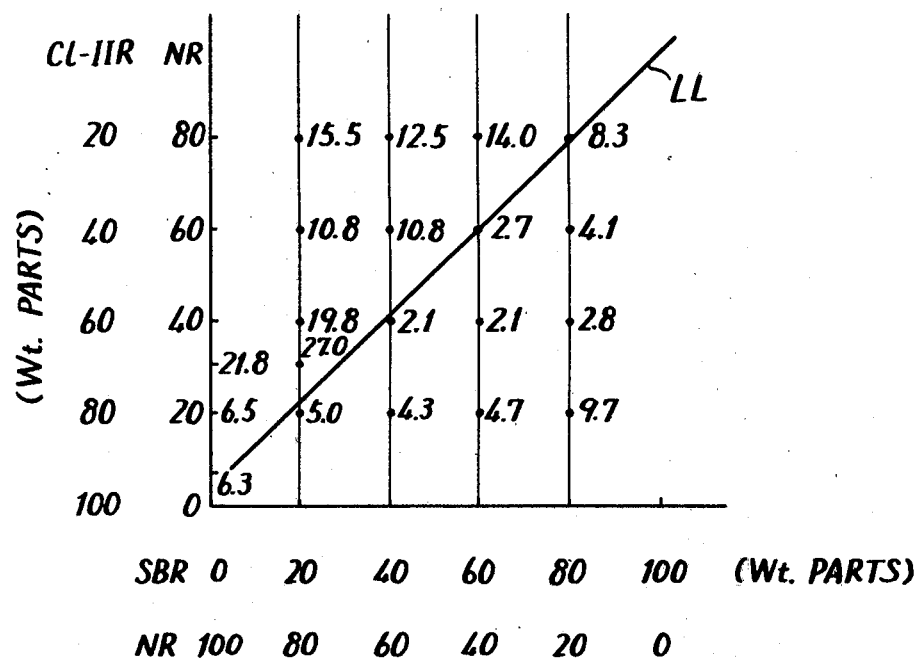
FIG. 5 and FIG. 6 are graphs showing the relation between the blending ratio of halogenated butyl rubber to natural rubber and the adhesive strength of the resulted vulcanized rubber.
Figure 6:
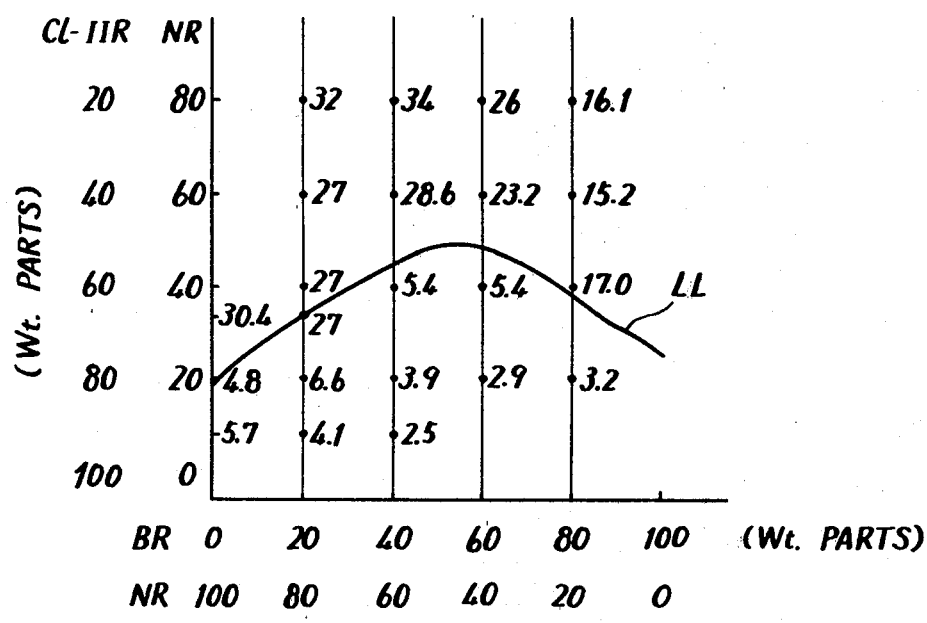

FIG. 5 and FIG. 6 show the relation between the blending ratio of chlorinated butyl rubber (Cl-IIR) to natural rubber (NR) and the adhesive strength (kg/cm) of the rubber compound basing on No. $L_4$ compound. In those figures, each abscissae represents the blending ratio of styrene-butadiene rubber (SBR) or butadiene rubber (BR) to NR, each ordinate represents the blending ratio of Cl-IIR to NR, each in weight parts and each LL-line means a limit line. The composition of a rubber blend which can be used for the purpose of the present invention should be situated within the region at the left hand side of the limit line (LL) or in other words, the limit line (LL) represents the lowest limit of the adhesive strength permitted in the present invention, wherein those numbers written in those figures are the values of the adhesive strength (kg/cm) corresponding to blending compositions.

After those preliminary experiments mentioned above, a series of final tests on the physical properties of rubbers prepared from various compositions of rubber compounds were carried out and the results are summarized in Table 2.

TABLE 2

| Composition of Rubber Compound and Physical Property | | | | | | | | | | | | |
|---|---|---|---|---|---|---|---|---|---|---|---|---|
| | Compound No. | | | | | | | | | | | |
| Composition | $S_1$ | $S_2$ | $S_3$ | $S_4$ | $S_5$ | $S_6$ | $S_7$ | $L_1$ | $L_2$ | $L_3$ | $L_4$ | $L_5$ | $L_6$ |
| N R | 30 | 100 | — | — | — | — | — | 50 | 50 | 100 | 60 | 20 | — |
| I R | — | — | 100 | 60 | 50 | 60 | 60 | — | — | — | — | — | — |
| B R | 70 | — | — | 40 | 50 | 40 | 40 | 50 | 20 | — | — | — | — |
| EPDM | — | — | — | — | — | — | — | — | 30 | — | — | — | — |
| HT10-66 | — | — | — | — | — | — | — | — | — | — | 40 | 80 | 100 |
| G P F | — | — | — | — | — | — | 50 | 10 | — | 50 | 50 | 50 |
| H A F | 80 | 60 | 40 | 30 | 15 | 35 | 40 | — | 30 | — | — | — | — |
| Nipsil VN3 | — | — | — | — | — | — | — | — | — | 45 | — | — | — |
| X-140 | 8 | 5 | 5 | 5 | 3 | 5 | 5 | 15 | — | 10 | 10 | 10 | 10 |
| Zinc Oxide | 5 | 5 | 5 | 5 | 5 | 5 | 5 | 5 | 5 | 5 | 5 | 5 | 5 |
| Stearic Acid | 3 | 3 | 3 | 3 | 3 | 3 | 3 | 3 | 3 | 3 | 3 | 3 | 3 |
| Phenyl-β-Naphtyl Amine | 2 | 2 | 2 | 2 | 2 | 2 | 2 | 2 | 2 | 2 | 2 | 2 | 2 |
| Cumaron Inden Resin | 10 | 4 | 4 | — | — | — | — | 5 | 8 | 2 | — | — | — |
| Accelerator | | | | | | | | | | | | | |

TABLE 2-continued

Composition of Rubber Compound and Physical Property

| Composition | S₁ | S₂ | S₃ | S₄ | S₅ | S₆ | S₇ | L₁ | L₂ | L₃ | L₄ | L₅ | L₆ |
|---|---|---|---|---|---|---|---|---|---|---|---|---|---|
| MSA Accelerator | 1.2 | 1 | 1 | — | — | — | — | — | 0.8 | — | — | — | — |
| CZ Accelerator | — | — | — | — | — | — | — | 1.3 | — | — | — | — | — |
| DM Accelerator | — | — | — | — | — | — | — | — | — | 0.5 | 1.5 | 1.5 | 1.5 |
| NS | — | — | — | 2.2 | 2.2 | 2.2 | 2.5 | — | — | 1.2 | — | — | — |
| Vultac 5 | — | — | — | — | — | — | — | — | — | — | 1.3 | 1.3 | 1.3 |
| Sulfur | 2.3 | 3 | 2.5 | 2.2 | 2.2 | 3.5 | 4.5 | 2 | 2 | 2.5 | — | — | — |
| Item of Test |  |  |  |  |  |  |  |  |  |  |  |  |  |
| Heat (°C.) build-up | 31 | 16 | 12 | 8 | 5 | 9 | 11 | 18 | 24 | 11 | 23 | 35 | 40 |
| JIS Hardness (hr) | 72 | 65 | 56 | 55 | 51 | 70 | 75 | 54 | 57 | 61 | 45 | 46 | 46 |
| Flexibility | 16 | 33 | 70 | 49 | 45 | 31 | 27 | 54 | 123 | 86 | 300< | 300< | 300< |
| Rebound (%) | 47 | 53 | 64 | 72 | 78 | 71 | 70 | 51 | 55 | 65 | — | — | 9 |

Remarks 1:
N R ... Natural Rubber
I R ... Polyisoprene Rubber
B R ... Polybutadiene Rubber
EPDM ... Etylene-Propylene Terpolymer Rubber
HT 10-66 ... Chlorinated Butyl Rubber made by ENJAY CHEMICAL CO., LTD. (USA)
GPF ... General purpose furnace black
HAF ... High abrasion furnace black
Nipsil VN₃ ... Silica made by NIPPON SILICA CO., LTD. (JAPAN)
X-140 ... Aromatic Oil made by KYODO SEKIYU CO., LTD. (JAPAN)
Accelerator MSA ... N—Oxydiethylene-2-Benzothiazyl Sulfenamide made by OHUCHI SHINKO CO., LTD. (JAPAN)
Accelerator CZ ... Cyclohexyl Benzothiazyl Sulfenamide made by OHUCHI SHINKO CO., LTD. (JAPAN)
Accelerator DM ... Benzothiaaolyl Disulfide made by OHUCHI SHINKO CO., LTD. (JAPAN)
Accelerator NS ... N—Tert-Butyl-2-Benzothiazyl Sulfenamide made by OHUCHI SHINKO CO., LTD. (JAPAN)
Vultac 5 ... Modified Alkyl Phenol-Disulfide made by PENNWALT CO., LTD. (U.S.A.)
Remarks 2:
(1) Heat build-up ... according to the regulation by ASTM D623-58A, surface temperature increase of rubber sample was measured at the atmospheric temperature of 40° C., using Goodrich Flexometer.
(2) Hardness ... according to JIS, hardness was measured, using a hardness-meter of spring type.
(3) Flexibility ... according to the regulation by ASTM D430, measurements were carried out using DeMattia Bending Tester.
(4) Rebound ... using a tester of Lupke type, measurements were carried out.

From Table 2, it can be concluded that, for the purpose of the side-reinforcement (5) of the present invention, the compound whose composition is less than 40 weight parts of carbon black to 100 weight parts of a rubber or a rubber compound, consisted of NR, IR, BR, each alone, or BR/IR, NR/BR, NR/BR/IR, each used in such a combination, can be effectively used. Especially, No. S₄ and S₅ in the table can be exemplified as the useful examples. As the raw material rubber for the protective layer (10) of the present invention, such combinations as IR/halogenated butyl rubber, NR/halogenated butyl rubber are desirable and the content of halogenated butyl rubber in the rubber compound is possible to be more 30 weight parts in 100 parts of the latter or more preferably 40-80 weight parts. As it is understood from Table 2, rubber compounds whose compositions are No. L₄, L₅ and L₆ are superior in the flexibility. Therefore, if the adhesive property of halogenated butyl rubber is improved, it may become possible to use up to 100% as the material for the protective layer (10) of the present invention.

The structure of the pneumatic safety tire of the present invention is as explained above. Here, the characteristic on the function of the tire will be explained. If it is remarked on the reason why the bead/rim separation does easily occur in the conventional pneumatic tire in the state of a decreasing inner pressure, it will be easily found that when the tire is subjected to a side force, a large turning motion of the bead portion occurs at first, putting the bead wire (6) as the center of the turn and then, the bead portion (1) drops into the base portion of the rim (R). This is nothing but the bead/rim separation.

Especially, when a conventional tire is running in a state, said turning displacement easily becomes large since there exists no inner pressure in the tire and, of course, there is no force to push back the bead (1) from the inside into its normal position on the rim flange (R₂). Thus, the bead (1) easily drops onto the base portion of the rim. Moreover, it can be pointed out that with the decrease of the inner pressure, the contacting area of the tire with the ground increases and the frictional resistance to the revolution of the tire also increases, accordingly, this acts to separate the bead (1) from the rim (R) more and more than in the normal running. Thus, the dropping of the bead (1) onto the base portion of the rim (R) occurs successively by the side force during running and at last the bead/rim separation occurs.

The possibility of the occurrence of bead/rim separation is not only influenced by the intensity of the side force itself but is also influenced by the radial sectional configuration around the base portion of the bead of tire. Generally, the configuration of the base portion of the bead in the conventional pneumatic tire is considered to have such a shape which permits an easy slip-down of the bead onto the base portion of the rim. This will surely help the bead/rim separation in the conventional tire.

Against such a situation of the conventional pneumatic tire mentioned above, the pneumatic safety tire of the present invention makes it possible to prevent the happening of the bead/rim separation completely, by providing the ring-formed projection (4), the reinforcing rubber layer (8) and the reinforcing rigid material (7) shown in FIG. 1.

The function of those elements will be explained referring FIG. 2. The turning motion of the bead (1), which is induced by a side force and turns around the bead wire (6) situated upon the bead seat (or rim flange)

($R_1$), can be completely suppressed by the existence of the reinforcement (7) which is disposed in the circumferential direction of the tire. That is, the rotational moment shown as the full line arrow in FIG. 2 is converted into a motion having the direction of the broken line arrow in the figure, since the reinforcement (7) scarcely becomes elongated. In this condition, unless a compression force acts, sufficient to compress and shorten the ring-shaped projection situated at the outer side of the rim flange ($R_2$), in such a dimension just equal to the length of the top end ($\delta$), the ring-shaped projection (4) never goes over the rim flange ($R_2$) or in other words, the bead/rim separation does not happen.

Therefore, it is sure that the bead (1) never separates from the rim flange ($R_1$), more and more surely with the decrease of the elongation of the reinforcing material (7), with the increase of $\delta$ within the allowable range and also with the decrease $\delta_2 (=\delta_1-\delta)$.

Figure 2:
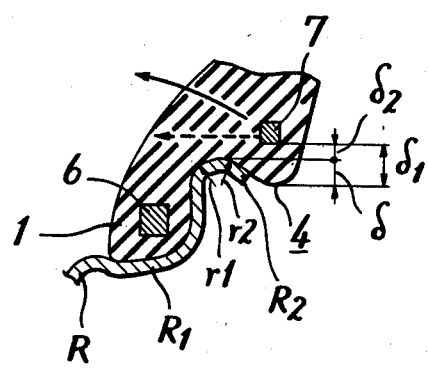
FIG. 2 is also a radial sectional view of the region near to the bead of the tire in order to make its structure more clear.

On the other hand, since the rim flange ($R_2$) of the rim (R), ordinarily, has two curvatures, ($r_1$) and ($r_2$), the displacement shown in the broken line arrow in FIG. 2, induced by the said side force which acts to the tire in the neighborhood of the portion where the tire contacts with the ground, is compensated with a recovering force when that portion of the tire has left the ground and, now, there exists no force to separate the bead from the rim.

Figure 9A:
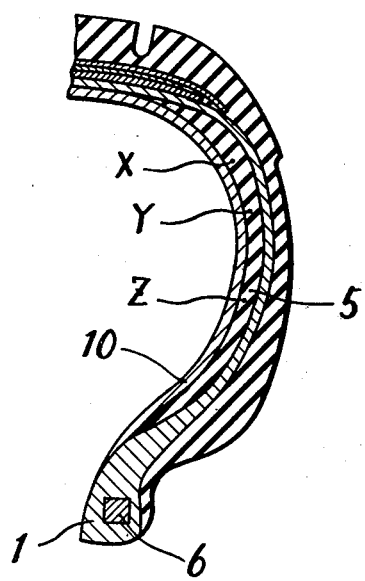
Figure 9B:
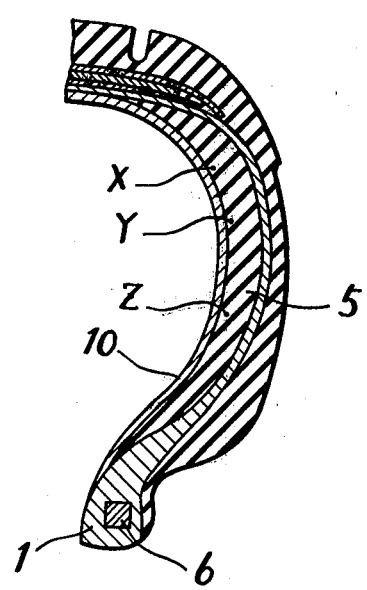

Next, the characteristic of the cornering force in a state of "run flat" will be considered. As shown by the broken line (g) in FIG. 7, although the cornering force of a conventional steel radial tire gradually increases with the increase of slip angle from the neighborhood of 6°–7°, the force itself is so small that it is impossible not only to prevent the bead/rim separation but also to feel the reaction with the steering wheel. Thus, the stability of driving is very much inferior in the conventional radial tire. Such a characteristic feature of the cornering force in the conventional steel radial tire, sometimes, brings a car into a dangerous state such as it starts to spin when a puncture happens at any one of the rear tires and the car enters into a "run flat" state. On the other hand, based upon a combat steel radial tire (hereafter this will be called a combat tire, simply) using a rubber compound, whose JIS hardness is 60°, as for the side reinforcement (5) of 13 mm of thickness as shown in FIG. 9B, arranging two plies of $1650^d/2$ Rayon cords in such a density as 23 ends/inch for the carcass and arranging two plies of $1\times5\times0.25$ steel cords and one ply of $1260^d/2$ Nylon cords in 23 ends/inch of density for the breaker, combat tire ($T_3$) whose cornering force at 1.7 kg/cm² of inner pressure was observed as line (a) in FIG. 7, was prepared and mounted on a conventional rim not provided with a stopper portion for the preparation of bead/rim separation and the cornering force in the "run flat" state was observed. The result is shown as line (d) in FIG. 7. In this case, the cornering force at the slip angle below about 5° was negative. The reason why such negative values were observed is considered as follows. There exists a certain degree of distortion in the contact between the bead and the rim and a force to resist it acts or in this case where the side wall of the tire is only reinforced elastically, the position of the bead on the rim flange almost freely fluctuates responding to a lateral force given to it since there exists no inner pressure to resist to the lateral force under a given load.

Figure 7:
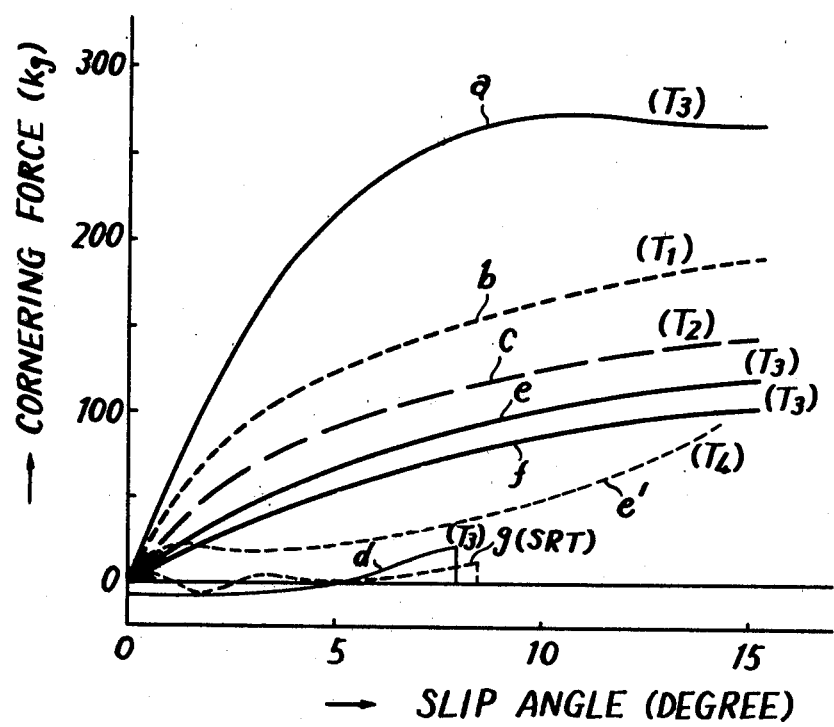
FIG. 7 shows a comparison of the pneumatic safety tire of the present invention with other conventional tires taking a typical characteristic property of tire.

Next, when combat tire ($T_3$) mentioned above was mounted on a conventional rim which has a metal projection of 3–4 mm of thickness in order to stop the slipping-down of the bead, the curve (f) in FIG. 7 was the observed result. However, it was rather a dangerous work to mount the tire onto the rim having such a projection since it needed a large pressure such as 12 kg/cm² for mounting.

Furthermore, when a rubber spacer whose hardness was 80° was provided in order to suppress the lateral movement of the bead of the Combat tire ($T_3$), the observed force was the curve (e) in FIG. 7. Surely, some improvement has been accomplished by providing such an attachment, however, it is not a remarkable improvement, since, for example, the cornering force in the "run flat" state was smaller than about 30% of that in the normal state, at 3° of the slip angle.

Figure 8A:
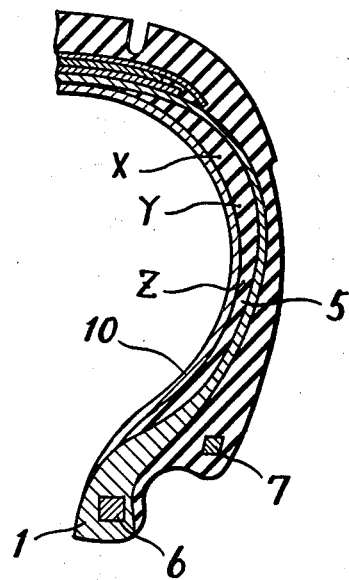
FIGS. 8A and 8B are radial sectional half views at the right hand side of the pneumatic safety tire of the present invention to show the positions which were chosen for the measurement of the heat build-up in the ring-formed elastic reinforcement additionally provided within the inside of the tire and FIGS. 9A and 9B are also radial sectional half views at the right hand side of the conventional pneumatic tire to show the positions which ere chosen for the measurement of the heat build-up in the ring-formed elastic reinforcement additionally provided within the inside of the tire.
Figure 8B:
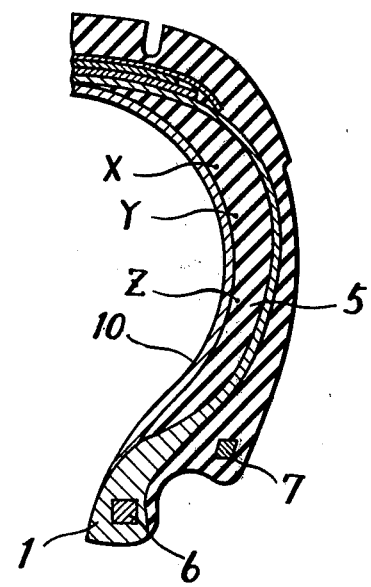

On the other hand, the pneumatic safety tire of the present invention ($T_1$) was provided as follows. That is, adding to the structure of the tire ($T_3$), a ring-formed projection (4) whose length ($\delta$) of the projection was 4 mm and its JIS hardness of the rubber layers (8), (9), were 75°, 60°, respectively, and a reinforcement (7) consisted of $3\times3\times0.96$ bead wire were provided. The tire ($T_1$) is shown in FIG. 8B. Furthermore, another example tire ($T_2$) was provided in which in the structure of the tire ($T_1$), the thickness of the side-reinforcement (5) was reduced from 13 mm to 8 mm as shown in FIG. 8A. The observed results on the cornering force of the tires ($T_1$) and ($T_2$) in each "run flat" state are shown in FIG. 7 as the broken line (b) and the broken line (c), respectively. From these data, it can be clearly understood that these tires ($T_1$) and ($T_2$) belonging to the pneumatic safety tire of the present invention have a large cornering force in the "run flat" state. For example, at 3° of the slip angle, the cornering force of the tire ($T_1$) in the "run flat" state is more than 60% of that in the normal state and that of the tire ($T_2$) in the "run flat" state is more than 45% of that in the normal state. The reason why such an improvement has been accomplished is considered to be (i) the ring-shaped projection (4) at the upper side of the bead (1) is enveloping the rim flange ($R_2$) to preserve an intimate contact between the bead (1) and the rim flange ($R_2$) against a lateral force and (ii) since the thickness of the side wall near to the ring-shaped projection (4) is necessarily large, the upper portion of the bead (1) has a sufficient rigidity to suppress the lateral movement of the side portion of the tire.

Said comparison of cornering force such as >60%, >45%, etc. were made based upon the data on the corresponding tire in the normal state such as 1.7 kg/cm² of inner pressure and 300 kg of load.

⊙ "Run flat" test of the tire ($T_1$)

Referring to the results shown in Table 2, a series of "run flat" tests of the tire ($T_1$) were carried out. The results are shown in Table 3. Though the "run flat" test based upon a bias tire was not carried out, a good result can also be expected.

The size of tires tested . . . 175/70 HR13
Conditions of "run flat" test:

| | |
|---|---|
| Running speed of tire | 80 km/hr |
| Rim used | 4J × 13 |
| Load | 80% of the load regulated by JIS |
| Room temperature | 38 ± 2° C. |

Heat build-up ... temperature measurement was carried out at 3 positions shown in FIGS. 8A,8B and 9A,9B, marked as X, Y and Z, respectively.

TABLE 3

Run Flat Test of Tire (1)

| Compound No. of side reinforcement | Compound No. of protective layer | Hour (hr) | Heat build-up (°C.) X | Y | Z | Score of running | Condition of a break down |
|---|---|---|---|---|---|---|---|
| $S_1$ | — | 0.5 | 160 | 175 | 150 | stop after 40 Km | (5) wrinkle, carbonize, abrade |
| | $L_1$ | 0.5 | 182 | 180 | 149 | | (10) crack, abrade |
| | | | | | | | (5) destroy |
| | $L_2$ | 0.5 | 179 | 187 | 160 | | (10) crack, abrade |
| | | | | | | | (5) destroy |
| | $L_3$ | 0.5 | 191 | 190 | 170 | | (10) separate |
| | | | | | | | (5) destroy |
| | $L_4$ | 0.5 | 171 | 179 | 160 | | (5) destroy |
| | $L_5$ | 0.5 | 186 | 176 | 162 | | (5) destroy |
| $S_2$ | — | 0.5 | 185 | 187 | 162 | stop after 40 Km | (5) wrinkle, carbonize, abrade, a part of |
| | | | | | | | (5) destroy |
| | $L_1$ | 0.5 | 174 | 190 | 146 | | (10) abrade |
| | $L_3$ | 0.5 | 136 | 138 | 121 | | (10) abrade |
| | $L_4$ | 0.5 | 146 | 149 | 131 | | (5) destroy slightly carbonize |
| | $L_5$ | 0.5 | 148 | 143 | 131 | | (5) destroy slightly carbonize |
| $S_3$ | — | 0.5 | 120 | 115 | 106 | stop after 40 Km | (5) wrinkle, carbonize, abrade |
| | $L_4$ | 4 | 123 | 126 | 116 | stop after 1920 Km | a part of (5): destroy |
| | | 12 | 129 | 185 | 121 | | (10) slightly carbonize |
| | | 24 | 139 | 145 | 125 | | |
| | $L_5$ | 4 | 121 | 125 | 111 | | |
| | | 12 | 129 | 136 | 126 | | |
| | | 24 | 143 | 147 | 128 | | |
| | $L_6$ | 0.5 | 119 | 114 | 110 | 640 Km | (10) separate, a part of (5) destroy |
| | | 2 | 121 | 125 | 114 | | |
| | | 4 | 128 | 122 | 111 | | |
| | | 8 | 155 | 161 | 129 | | |
| $S_4$ | — | 1 | 121 | 124 | 120 | stop after 80 Km | (5) wrinkle, carbonize, abrade |
| | $L_4$ | 0.5 | 115 | 116 | 114 | 3860 Km | non failure temperature of tire: |
| | | 2 | 110 | 109 | 110 | | constant and stable |
| | | 8 | 119 | 118 | 117 | | |
| | | 24 | 120 | 118 | 119 | | |
| | | 32 | 119 | 121 | 120 | | |
| | | 48 | 121 | 123 | 122 | | |
| | $L_5$ | 0.5 | 113 | 117 | 110 | 3860 Km | non failure temperature of tire: |
| | | 2 | 114 | 115 | 112 | | constant and stable |
| | | 8 | 117 | 118 | 117 | | |
| | | 24 | 120 | 119 | 120 | | |
| | | 30 | 119 | 121 | 118 | | |
| | | 30 | 119 | 122 | 121 | | |
| | | 48 | 122 | 123 | 121 | | |
| | $L_6$ | 0.5 | 117 | 121 | 119 | 960 Km | (10) separate CI—IIR contents in the |
| | | 2 | 118 | 119 | 114 | | layer: high |
| | | 4 | 123 | 124 | 121 | | adhesion: poor |
| | | 8 | 121 | 125 | 120 | | |
| | | 10 | 120 | 125 | 122 | | |
| | | 12 | 130 | 135 | 127 | | |
| $S_5$ | $L_4$ | 0.5 | 119 | 116 | 110 | 3860 Km | non failure temperature of tire: |
| | | 2 | 121 | 120 | 112 | | constant and stable |
| | | 8 | 123 | 123 | 113 | | |
| | | 24 | 120 | 125 | 111 | | |
| | | 32 | 120 | 124 | 112 | | |
| | | 48 | 122 | 126 | 111 | | |
| | $L_5$ | 0.5 | 118 | 117 | 110 | 3860 Km | non failure temperature of tire: |
| | | 2 | 120 | 115 | 112 | | constant and stable |
| | | 8 | 123 | 119 | 111 | | |
| | | 24 | 120 | 116 | 115 | | |
| | | 30 | 121 | 114 | 110 | | |
| | | 36 | 118 | 115 | 113 | | |
| | | 48 | 119 | 113 | 110 | | |
| | $L_6$ | 0.5 | 116 | 119 | 109 | 800 Km | (10) separate CI—IIR content in the |
| | | 2 | 119 | 120 | 110 | | layer: high |
| | | 4 | 123 | 118 | 111 | | adhesion: poor |
| | | 8 | 120 | 119 | 118 | | |
| | | 10 | 118 | 120 | 112 | | |

TABLE 3-continued

Run Flat Test of Tire (1)

| Compound No. of side reinforcement | Compound No. of protective layer | Hour (hr) | Heat build-up (°C.) | | | Score of running | Condition of a break down |
|---|---|---|---|---|---|---|---|
| | | | X | Y | Z | | |

As it is clearly understood from Table 3, those compounds as No. $S_4$ and $S_5$ for the side-reinforcement (5) and No. $L_4$ and $L_5$ for the protective layer (10) are most desirable. Though the running test was stopped after 3860 km of running, it is sure that in those cases where any combination of such desirable rubber compounds is used, further running tests for a longer distance are possible, because of retaining almost constant temperatures.

On the other hand, the fact that the tire ($T_2$) has a large cornering force in the "run flat" state as shown in the curve (c) of FIG. 7 suggests that even if the thickness of the side-reinforcement (5) is smaller than that of the tire ($T_1$), if proper rubber compounds are selected as shown in Table 3, a superior pneumatic tire belonging to the scheme of the present invention can be produced. Table 4 shows such examples, wherein based on the tire ($T_2$), the rubber compounds No. $S_4$ and $S_5$ for the side-reinforcement (5) and No. $L_4$ for the protective layer (10) were selected as the proper combination of them.

From the results shown in Table 4, it is now clear that even if the thickness of the side-reinforcement (5) is considerably decreased, a pneumatic safety tire having a superior durability can be produced.

Moreover, another example on a tire ($T_4$) whose structure was also shown in FIG. 9A, will be explained, wherein the Combat tire ($T_4$) was prepared based on the Combat tire ($T_3$), but reducing the thickness of its side-reinforcement (5) from 13 mm to 8 mm and using a combination of No. $S_4$ or $S_5$ as the material for the side-reinforcement (5) and $L_4$ for the protective layer (10). The results of the "run flat" test are shown in Table 4-1 and 4-2. Although the Combat tire ($T_4$) appearing in Table 4-2 had a considerable durability, it is somewhat inferior to the tire ($T_2$) of the present invention appearing in Table 4-1 in the results of its running test. In case of the tire ($T_4$) fitted on a rim with a spacer as already mentioned, the obtained result on the cornering force by the "run flat" test is shown in FIG. 7 as the curve (e'). From these data shown as the curve (e'), it is sure that the combination of the tire structure of the present invention and the materials such as No. $S_4$, $S_5$ and $L_4$ is more desirable. By the way, as shown in Table 4-1, in case of the tire ($T_2$), examples wherein the rubber compound for the side-reinforcement (5), No. $S_6$ or $S_7$ was used in place of No. $S_4$ or $S_5$ in order to change the hardness, showed also that they have a considerable durability and moreover, have a larger cornering force than that of the curve (c) in FIG. 7.

As an example of a publication where a rubber whose hardness is more than 45° (JIS) is used as the rubber compound for the side-reinforcement, Japanese Patent Publication S.49 (1974)-20802 is known, which describes the desirable hardness is 60°–90° (JIS). However, it was found by a "run flat" test that a tire which was prepared using a rubber compound having 65° or 72° of JIS hardness for the side-reinforcement that it became impossible to continue further running after 80 minutes of running because of the break-down of the side portion. Therefore, it can be understood that it is more effective to use a rubber as the compound for the side-reinforcement which has only a low heat build-up and had a proper hardness rather than to use a rubber of high hardness and rigidity.

TABLE 4-1

Run Flat Test of Tire ($T_2$)

| Compound No. of side reinforcement | Compound No. of protective layer | Hour (hr) | Heat build-up (°C.) | | | Score of running | Condition of a break down |
|---|---|---|---|---|---|---|---|
| | | | X | Y | Z | | |
| $S_4$ | $L_4$ | 0.5 | 125 | 130 | 115 | stop after 360 Km | (10) slightly wrinkled |
| | | 1 | 145 | 150 | 130 | | |
| | | 6 | 155 | 160 | 137 | | |
| $S_5$ | $L_4$ | 0.5 | 130 | 130 | 116 | stop after 360 Km | (10) slightly wrinkled |
| | | 1 | 150 | 152 | 135 | | |
| | | 6 | 155 | 154 | 139 | | |
| $S_3$ | $L_4$ | 0.5 | 165 | 168 | 150 | 80 Km | (10) separate |
| | | 1.0 | 170 | 182 | 159 | | (5) destroy after abrade |
| $S_7$ | $L_4$ | 0.5 | 145 | 150 | 120 | 240 Km | (10) carbonize |
| | | 1 | 165 | 170 | 145 | | (5) destroy after abrade |
| | | 3 | 170 | 174 | 148 | | |
| $S_6$ | $L_4$ | 0.5 | 140 | 150 | 136 | 320 Km | (10) separate |
| | | 1 | 148 | 165 | 146 | | (5) destroy after abrade |
| | | 4 | 160 | 165 | 150 | | |

Remarks:
(5) is side reinforcement
(10) is protective layer

TABLE 4-2

Run Flat Test of Tire (T₄)

| Compound No. of side reinforcement | Compound No. of protective layer | Hour (hr) | Heat build-up (°C.) | | | Score of running | Condition of break down |
|---|---|---|---|---|---|---|---|
| | | | X | Y | Z | | |
| S₄ | L₄ | 0.5 | 150 | 161 | 139 | 360 Km | a part of (10): separate |
| | | 1 | 155 | 168 | 140 | | (5): slightly abrade |
| | | 6 | 165 | 170 | 158 | | |
| S₅ | L₄ | 0.5 | 148 | 163 | 139 | 360 Km | a part of (10): carbonize, separated part: abrade |
| | | 1 | 155 | 170 | 152 | | |
| | | 6 | 160 | 172 | 156 | | |

Remarks:
(5) is side reinforcement
(10) is protective layer

⊙ CBU test

Next, Table 5 shows the results of the running test under CBU condition regulated by FMVSS-109 (hereafter, this test will be called as CBU test, in short).
Tire tested ... $(T)_2$: 175/70 HR 13
CBU condition:
Running speed ... 80 km/hr
Rim used ... 4J × 13,
Room Temperature ... 38° ± 2° C.

Load, Pressure and Hour are shown as follows.

| Conditions | NO. | | | | |
|---|---|---|---|---|---|
| | I | II | III | IV | V |
| Load (%) | 100 | 108 | 118 | 140 | 160 |
| Pressure (psi) | 24 | 28 | 32 | 32 | 32 |
| Hour (hr) | 4 | 6 | 24 | 24 | 24 |

Remarks:
NO. I, II and III were tested according to the regulation of FMVSS-109 NO. IV and V were tested under overload greater than the regulation's load.

TABLE 5

CBU Test

| Compound No. of side reinforcement | Compound No. of protective layer | I | II | III | IV | V |
|---|---|---|---|---|---|---|
| S₃ | — | non failure | → → → | ⓐ part crack | ⓑ ⓒ parts: carbonize, abrade | → → |
| | L₁ | non failure | → → → | a part crack | ⓑ ⓒ parts: carbonize, abrade | → → |
| | L₄ | non failure | → → → | → → → | → → → → | non failure |
| | L₅ | non | → → → | → → → | → → → → | non failure |
| S₄ | — | non failure | ⓐ part crack | → → → | → → → → | → → |
| | L₂ | non failure | → → → | ⓐ part crack | ⓑ ⓒ parts: carbonize, abrade | → → |
| | L₃ | non failure | → → → | → → → | → → → → | non failure |
| | L₄ | non failure | → → → | → → → | → → → → | non failure |
| | L₆ | non failure | → → → | → → → | protective layer: separate | → → |
| S₅ | — | non failure | ⓐ part crack | → → → | → → → → | → → |
| | L₁ | non failure | → → → | ⓐ part crack | ⓑ ⓒ parts: carbonize, abrade | → → |
| | L₄ | non failure | → → → | → → → | → → → → | non failure |
| | L₅ | non failure | → → → | → → → | → → → → | non failure |

From Table 5, it can be understood that those tires evaluated to be superior by the "run flat" test in Table 3 are also evaluated to be superior by the CBU test. However, there exists a slight difference in the evaluation of the rubber compound in both tests, that is, against the fact that No. S₄ and S₅ and L₄ were determined to be useful as the compounds for the side-reinforcement (5) and the protective layer (10), respectively, by the "run flat" test as already explained, CBU test brings such a conclusion that No. S₃, S₄ and S₅ as the compound for the side-reinforcement (5) and No.

$L_3$, $L_4$ and $L_5$ as the compound for the protective layer (10) are useful for the present invention. Those facts may come from the difference in severity of the testing condition in both cases, since it is clear that smaller troubles happen in the CBU test than in the "run flat" test. Moreover, in an additional test, CBU test shows that No. $S_1$ and $S_2$ in the combination with No. $L_4$ or $L_4$ are also useful.

⊙High speed test

Next, a series of high speed running tests were carried out in order to confirm what trouble, and when and where it happens (hereafter, this test will be called, simply, the high speed test). The results are shown in Table 6.

Conditions of high speed test:

| Tire tested | ($T_2$): 175/70 HR 13 conventional steel radial tire: 175/70 HR 13 |
|---|---|
| Rim used | 4J × 13, 4½ × 13 |
| Inner pressure of tire | 1.7 kg/cm², 300 kg of load |
| Room temp. in testing | 38 ± 2° C. |

| Condition | No. | | | | | | | | | |
|---|---|---|---|---|---|---|---|---|---|---|
| | 1' | I | II | III | IV | V | VI | VII | VIII | IX |
| Speed (Km/hr) | 80 | 120 | 128 | 136 | 144 | 152 | 160 | 168 | 176 | 184 |
| Hour (hr) | 2 | 0.5 | 0.5 | 0.5 | 0.5 | 0.5 | 0.5 | 0.5 | 0.5 | continue |

Remarks:
No. 1' means Preliminary running (so-called "Brake in")

TABLE 6

High Speed Durability Test

| Construction of tire | Compound No. of side reinforcement | Compound No. of protective layer | Score of Running | | | | | | | | | part of a break down |
|---|---|---|---|---|---|---|---|---|---|---|---|---|
| | | | VI | VII | VIII | IX | Running hour (hr) 2 | 4 | 6 | 8 | 10 | |
| $T_2$ | $S_1$ | $L_1$ | → | → | → | | | | | | | Sh |
| | | $L_4$ | → | → | → | | | | | | | Sh |
| | $S_2$ | $L_1$ | → | → | → | → | → | | | | | Sh |
| | | $L_4$ | → | → | → | → | → | | | | | Sh |
| | $S_3$ | $L_1$ | → | → | → | → | → | → | → | | | Sh |
| | | $L_4$ | → | → | → | → | → | → | → | | | Sh |
| | $S_4$ | $L_1$ | → | → | → | → | → | → | → | → | → → → → → → | No |
| | | $L_4$ | → | → | → | → | → | → | → | → | → → → → → → | No |
| SRT | Construction without side-reinforcement of $T_4$ | | → | → | → | → | → | → | → | | | Sh |
| | | | → | → | → | → | → | → | → | → | → | Sh |

Remark:
SRT is conventional steel radial tire.

As shown in Table 6, those tires which were evaluated to be superior by the "run flat" test or by the CBU test were proved to be also superior by the high speed test and they showed their characteristic behavior to adapt to high speed running, not inferior to conventional steel radial tires. Although the positions where troubles happened in the high speed running test were somewhat different from those in the "run flat" test, the effect of the use of the rubber compound whose heat build-up is very low, as the rubber compound for the side-reinforcement (5) in order to prevent a large temperature increase in the side wall zone, is now clear. That is to say, by the choice of a proper combination of a rubber compound which can be determined experimentally by the "run flat" test or CBU test or the high speed test or by combinations of them as the present invention has done and by the adoption of a construction of tire as proposed by the present invention, now, it has become possible to provide a superior pneumatic safety tire.

As explained above in detail, the superiority of the pneumatic safety tire of the present invention is now clear. Although the experimental tests were only made on those tires based upon the radial tire, it is sure the same satisfactory result will be obtained if the test is carried on the bias tire based upon the tires of the present invention. Since the pneumatic safety tire of the present invention, which is provided with at least one ring-shaped projection (4) having a high rigidity along the circumferential direction of the projection and having a smaller diameter than that of the rim flange that the tire is mounted on, in the outside along the rim flange so that it projects to the outside along the flange, the tire never undergoes the bead/rim separation even in a "run flat" state. And it is possible to mount it on an ordinary rim and moreover its mounting and dismounting are very easy, and moreover, its running after a puncture and in a "run flat" state can be done stably.

Moreover, since the pneumatic safety tire is adhered integrally by vulcanization together with two ring-formed elastic reinforcements (5) consisted of a rubber compound whose temperature increase defined as already explained is within the range of 3°–12° C. and two protective layers (10) consisted of a rubber containing more than 30 parts of a halogenated butyl rubber within 100 parts of a rubber compound, not only is it very much improved in durability in the CBU test and the high speed test under an ordinary inner pressure of the tire, more than any Combat tire, but also its stability in driving and durability in the "run flat" state are very much enhanced. Simultaneously, various origins that cause destruction of the tire in the "run flat" state are removed and the bead/rim separation is completely prevented. Thus, the present invention is able to provide a useful, light weight compact and superior safety pneumatic tire as mentioned above.

The embodiments of the invention in which an exclusive property or privilege is claimed are defined as follows:

1. In a pneumatic tire and wheel rim assembly, said tire comprising a pair of axially spaced-apart annular beads, a side wall extending radially outwardly from each of the beads, a shoulder at the radially outer end of each of the side walls and an annular tread crown extending between said shoulders, said wheel rim having an axially extending rim base, bead seats at the opposite ends of said rim base and terminating in radially outwardly directed rim flanges, the improvement which comprises: said tire has at least one annular projection of high rigidity in the circumferential direction, said projection being located on the axially outer side of said wheel rim outside of its associated bead and adjacent to its associated rim flange, said annular projection being made of rubber and being reinforced with an annular rigid reinforcement, said projection being of smaller diameter than and projecting radially inwardly of its associated rim flange a distance such that the largest radius of its associated rim flange is from 2 to 7 mm larger than the smallest radius of said projection under conditions of atmospheric internal pressure and no load on the tire; two elastic side reinforcement layers which respectively extend along and cover the interiors of the side walls and the corresponding shoulders of the tire, said elastic side reinforcement layers being made of a rubber whose surface temperature increase is in the range of 3° to 12° C., measured by ASTM-D632-58A using a Goodrich flexometer, said elastic side reinforcement layers being shaped so that they are thickest at said shoulders of said tire and their thicknesses gradually decrease toward said tread crown and toward their associated side wall; a protective rubber layer covering the interior surface of said tire including said side reinforcement layers and being vulcanized together with said side reinforcement layers, said protective rubber layer containing more than 30% of halobutyl rubber, so that on deflation of the tire during running thereof the beads of the tire do not separate from the rim, the cornering force remains high and the side walls of the tire do not undergo excessive heat build-up and are resistant to failure due to wrinkling, cracking or abrasion.

2. The pneumatic safety tire and wheel rim as claimed in claim 1, in which said annular rigid reinforcement is located radially outwardly from the largest radius of the rim flange a distance of from zero to 3 mm.

3. The pneumatic safety tire and wheel rim as claimed in claim 2, in which the upper side of said annular projection is reinforced with a rubber layer whose JIS hardness is 65°–85°.

4. The pneumatic safety tire and wheel rim as claimed in claim 3, in which said rigid reinforcement has a Young's modulus of more than 2,000 kg/mm$^2$ and a breaking strength of more than 400 kg.

5. The pneumatic safety tire and wheel rim as claimed in claim 4, in which said rigid reinforcement consists of bead wire, steel wire, glass fiber cord, rubber reinforced with glass fiber or plastic material reinforced with glass fiber.

6. The pneumatic safety tire and wheel rim as claimed in claim 1, in which said elastic side reinforcement layers have thicknesses in the regions corresponding to the junctures of the shoulders with the side walls such that the thickness of the tire threat is from 0.06 to 0.20 times the height (H) of the tire.

7. The pneumatic safety tire and wheel rim as claimed in claim 1, in which said protective layer contains 30–80% of halogenated butyl rubber, based on the total rubber component contained therein.

8. The pneumatic safety tire and wheel rim as claimed in claim 7, in which said halogenated butyl rubber is chlorinated butyl rubber or brominated butyl rubber.

9. The pneumatic safety tire and wheel rim as claimed in claim 1, in which each of said beads is reinforced with a steel cord or a textile cord in the region between said rigid reinforcement of said annular projection and the base portion of said bead.

10. The pneumatic safety tire and wheel rim as claimed in claim 1, in which said elastic side reinforcement layers are made of a rubber composition containing 100 weight parts of polybutadiene rubber, natural rubber, polyisoprene rubber, or mixture thereof, 20–40 parts of carbon black, 1–15 parts of zinc white, 1–5 parts of stearic acid, 1–3 parts of sulphur, antioxidant and accelerator.

11. The pneumatic tire and wheel rim as claimed in claim 1 in which the range of surface temperature increase of said elastic side reinforcement layers is from 4° to 8° C.

12. The pneumatic tire and wheel rim as claimed in claim 1 in which said tire has two of said annular projections, each of said annular projections being associated with one of said beads.

* * * * *

UNITED STATES PATENT AND TRADEMARK OFFICE
CERTIFICATE OF CORRECTION

PATENT NO. : 4 365 659
DATED : December 28, 1982
INVENTOR(S) : Akira YOSHIDA and Masanori KAN It is certified that error appears in the above-identified patent and that said Letters Patent are hereby corrected as shown below:

Claim 4, line 2; change "claim 3" to ---claim 2---.

Signed and Sealed this

Twenty-second Day of March 1983

[SEAL]

Attest:

GERALD J. MOSSINGHOFF

Attesting Officer   Commissioner of Patents and Trademarks